United States Patent
Posselt et al.

(10) Patent No.: US 6,865,879 B2
(45) Date of Patent: Mar. 15, 2005

(54) METHOD AND DEVICE FOR DETERMINING THE FUEL QUANTITY FOR A BURNER IN THE EXHAUST-GAS SYSTEM OF AN INTERNAL COMBUSTION ENGINE

(75) Inventors: Andreas Posselt, Muehlacker (DE); Wolfgang Boerkel, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/389,333

(22) Filed: Mar. 14, 2003

(65) Prior Publication Data

US 2003/0221425 A1 Dec. 4, 2003

(30) Foreign Application Priority Data

Mar. 14, 2002 (DE) ......................................... 102 11 115

(51) Int. Cl.[7] ............................................... F01N 3/00
(52) U.S. Cl. ........................... 60/276; 60/286; 60/289; 60/293; 60/303
(58) Field of Search ......................... 60/274, 286, 287, 60/288, 289, 292, 293, 303

(56) References Cited

U.S. PATENT DOCUMENTS 4,651,524 A * 3/1987 Brighton ..................... 60/274
5,617,720 A * 4/1997 Achleitner et al. ........... 60/274
5,722,588 A * 3/1998 Inoue et al. ........... 237/12.3 C
5,964,088 A * 10/1999 Kinugasa et al. ............. 60/286
6,293,241 B1 * 9/2001 Suzuki ................ 123/142.5 R
6,345,496 B1 * 2/2002 Fuwa et al. .................... 60/274

FOREIGN PATENT DOCUMENTS

DE            44 30 965        3/1996

OTHER PUBLICATIONS

Kraftfahrtechnisches Taschenbuch [Automotive Handbook], 22nd edition, VDI Publishing House, Duesseldorf, ISBN 3–18–4 19122–2, pp. 491 and 492*.

* cited by examiner

Primary Examiner—Binh Q. Tran
(74) Attorney, Agent, or Firm—Kenyon & Kenyon

(57) ABSTRACT

An electronic control device and method for determining the fuel quantity at which a burner is operated whose exhaust gas mixes with the exhaust gas of an internal combustion engine in an exhaust-gas system in front of a catalytic converter, in which a first oxygen concentration in the exhaust gas of the internal combustion engine is measured spatially before the mixing of the exhaust gas of the burner with the exhaust gas of the combustion engine, a second oxygen concentration in the intermixed exhaust gas is measured, and the fuel quantity at which the burner is operated is determined on the basis of processing the first oxygen concentration and the second oxygen concentration.

14 Claims, 4 Drawing Sheets

METHOD AND DEVICE FOR DETERMINING THE FUEL QUANTITY FOR A BURNER IN THE EXHAUST-GAS SYSTEM OF AN INTERNAL COMBUSTION ENGINE

FIELD OF THE INVENTION

The present invention relates to a method for determining the fuel quantity used to operate a burner whose exhaust gas mixes with the exhaust gas of an internal combustion engine in an exhaust-gas system upstream from a catalytic converter.

BACKGROUND INFORMATION

A catalytic converter may convert undesired waste-gas components, such as HC, CO and NOx into less harmful components, such as H2O, CO2 and N2. To comply with increasingly stricter emission limit values, it may be desired that pollutant conversion be quickly applied in the three-way catalytic converter following a cold start of the combustion engine (of the internal combustion engine). Since the conversion may only set in above a minimum temperature, this minimum temperature should be reached as quickly as possible after a start.

To more rapidly heat a catalytic converter following a start, a burner located upstream from the catalytic converter may be used, which heats up the catalytic converter before and/or during and/or directly following an engine start. Using a burner for this purpose is discussed, for example, in German Published Patent Application No. 44 30 965.

By using a burner, an exhaust-gas heating effect may be produced without a feedback effect on the engine. A burner may have a separate combustion chamber upstream from the catalytic converter, and an external ignition source. The burner may function in that fuel, which is supplied via a fuel path, is mixed separately (i.e. in addition to supplying fuel to the internal combustion engine) with air that is supplied via an air path, and is ignited and burned by the ignition source. The burner's flame and its hot exhaust gases may heat up the downstream catalytic converter. The aforementioned document discusses that both burner air, as well as fuel are supplied to a burner nozzle via a fuel shutoff valve and a fuel regulator 34. Although the use of the term "regulator" may point to a closed-loop for correcting the fuel supply to the burner, it is believed that German Published Patent Application No. 44 30 965 does not describe a detection or measuring of the fuel quantity which is used to operate the burner. However, with a view to complying with optimal setpoint values for the firing of the burner and for a burner operation where the pollutant emission is kept as low as possible, as well as for a diagnostics of the fuel path, it may be desirable to know the absolute fuel quantity or the relative fuel quantity normalized to the burner-air quantity (the fuel/air ratio) at which the burner is operated.

SUMMARY OF THE INVENTION

The present invention is directed to providing an exemplary method for determining the fuel quantity (absolute or relative) at which a burner is operated whose exhaust gas mixes with the exhaust gas of an internal combustion engine in an exhaust system upstream from a catalytic converter.

In an exemplary method of the mentioned type, this may be achieved by the following steps:

measuring a first oxygen concentration C1 in the exhaust gas of the internal combustion engine spatially upstream from a location where the burner's exhaust gas is mixed with that of the combustion engine;

measuring a second oxygen concentration C2 in the intermixed exhaust gas;

measuring the fuel quantity at which the burner is operated on the basis of a processing of the first oxygen concentration and the second oxygen concentration.

The exemplary method according to the present invention assumes the measuring of an oxygen concentration C2 after the exhaust gas of the burner and the internal combustion engine have been intermixed. This oxygen concentration may be measured, for instance, by a lambda sensor, as it may already be part of the system provided in a control system for internal combustion engines. The lambda sensor may be mounted inside a catalytic converter or downstream from it. Such a sensor positioned downstream from the exhaust gas catalytic converter may be used, for instance, to perform diagnostics on the exhaust-gas catalytic converter or to correct the control of the fuel/air ratio at which the internal combustion engine is operated. In this context, the signal of the lambda sensor behind the exhaust-gas catalytic converter, for instance, may correct the setpoint value to which the signal of a first lambda sensor located before the first catalytic converter is compared.

The lambda sensor behind or inside the catalytic converter may detect an average fuel-air ratio, so to speak, which may be made up of the separate fuel/air ratios at which the internal combustion engine and the burner are operated. According to an exemplary method of the present invention, the fuel quantity at which the burner is operated may be determined from measured values for the oxygen concentration in the exhaust gas of the internal combustion engine and for the oxygen concentration in the intermixed exhaust gas.

One exemplary embodiment of the present invention may be distinguished in that, in determining the fuel quantity, the air quantity flowing into the internal combustion engine and the air quantity flowing into the burner may be processed as well.

A further exemplary embodiment may distinguished in that the fuel quantity may be determined on the basis of the following relationship:

$$\lambda B = (mLB \cdot \lambda ges \cdot \lambda M)/[\lambda M(mLM+mLB)-mLM \cdot \lambda ges].$$

In this context, $\lambda B$ corresponds to the fuel-air ratio at which the burner is operated. This fuel-air ratio, thus, may correspond to the fuel quantity at which the burner is operated, relative to the air quantity at which the burner is operated. This fuel-quantity value consequently may represent a relative fuel quantity, so to speak. In particular, mLM stands for the air quantity at which the combustion engine is operated, mLB stands for the air quantity at which the burner is operated, $\lambda M$ represents the fuel-air ratio at which the combustion engine is operated, and $\lambda ges$ represents the fuel-air ratio that results as the average fuel-air ratio when the exhaust gas of the burner and the internal combustion engine are mixed. Also, ges may be uniquely assigned to oxygen concentration C2, and $\lambda M$ may be uniquely assigned to oxygen concentration C1. Examples of lambda sensors that convert the oxygen concentration in the exhaust gas into an electric signal for the purpose of determining the respective lambda value, may be described, for instance, in the Kraftfahrtechnisches Taschenbuch [Automotive Handbook], 22nd edition, VDI Publishing House, Duesseldorf, ISBN 3-18-4 19122-2, pages 491 and 492.

Alternatively, according to an exemplary method of the present invention an absolute fuel quantity may be determined based on the following relationship:

$$mKB=F^{*}[(mLM+mLB)/\lambda ges-mLM/\lambda].$$

F stands for the value 14, 7 (stoichiometric air ratio), mKB represents the fuel mass at which the burner is operated.

An additional exemplary method according to the present invention may be distinguished in that it may be used for diagnosing the fuel path. More specifically, this exemplary embodiment may provide for the measured fuel quantity to be compared to a predefined value, and for a deviation of the measured fuel quantity from the predefined value that exceeds a threshold value to produce an error message signaling a fault in the fuel supply of the burner. With the aid of this exemplary embodiment, an error function of the fuel path may be detected. It is believed that a diagnosis of the fuel path for a burner in the exhaust-gas system of an internal combustion engine has not been known heretofore.

Another exemplary embodiment may be distinguished in that the fuel supply to the burner may be regulated in a closed loop control circuit, a controlled variable for adjusting the fuel-air ratio being formed with the aid of the measured first oxygen concentration and the measured second oxygen concentration.

With the aid of this exemplary embodiment, the fuel supply to the burner may be adjusted for optimal operation of the burner, with respect to emission values and heating efficiency. The aforementioned relationships for λB and mKB may allow a precalculation of the effect of a change of controlled variable mKB on the total lambda value λges, which may be detected by a sensor as a measure of the oxygen concentration C2 and, thus, be controlled. The exemplary embodiments described heretofore may assume operational lambda sensors for measuring the oxygen concentrations C1 and C2.

Another exemplary embodiment of the present invention may allow an optimal fuel metering for the firing of the burner. Since the firing of the burner may occur early in connection with a start of the internal combustion engine, the exhaust-gas sensors may not yet be operational at this time, so that a direct correction of the ignition lambda value, which may occur even before the firing of the burner, may not be implemented. According to an exemplary embodiment of the present invention, the relative or absolute fuel quantity at which the burner is operated in a first operating phase may be determined and compared to a predefined setpoint value. Furthermore, a correction value representing a measure of the faulty adaptation of the fuel supply in the first operating phase, may be formed from the deviation of the measured fuel quantity from the setpoint value. At the beginning of a further operating phase, this correction value obtained during a preceding operating phase may be used to correct the fuel supply to the burner, in the sense of setting a desired, ideally optimal, lambda value for the firing of the burner.

An exemplary embodiment of the present invention may also be directed to a control device for implementing at least one of the afore-mentioned exemplary methods and/or one of the exemplary embodiments.

DETAILED DESCRIPTION

Figure 1:
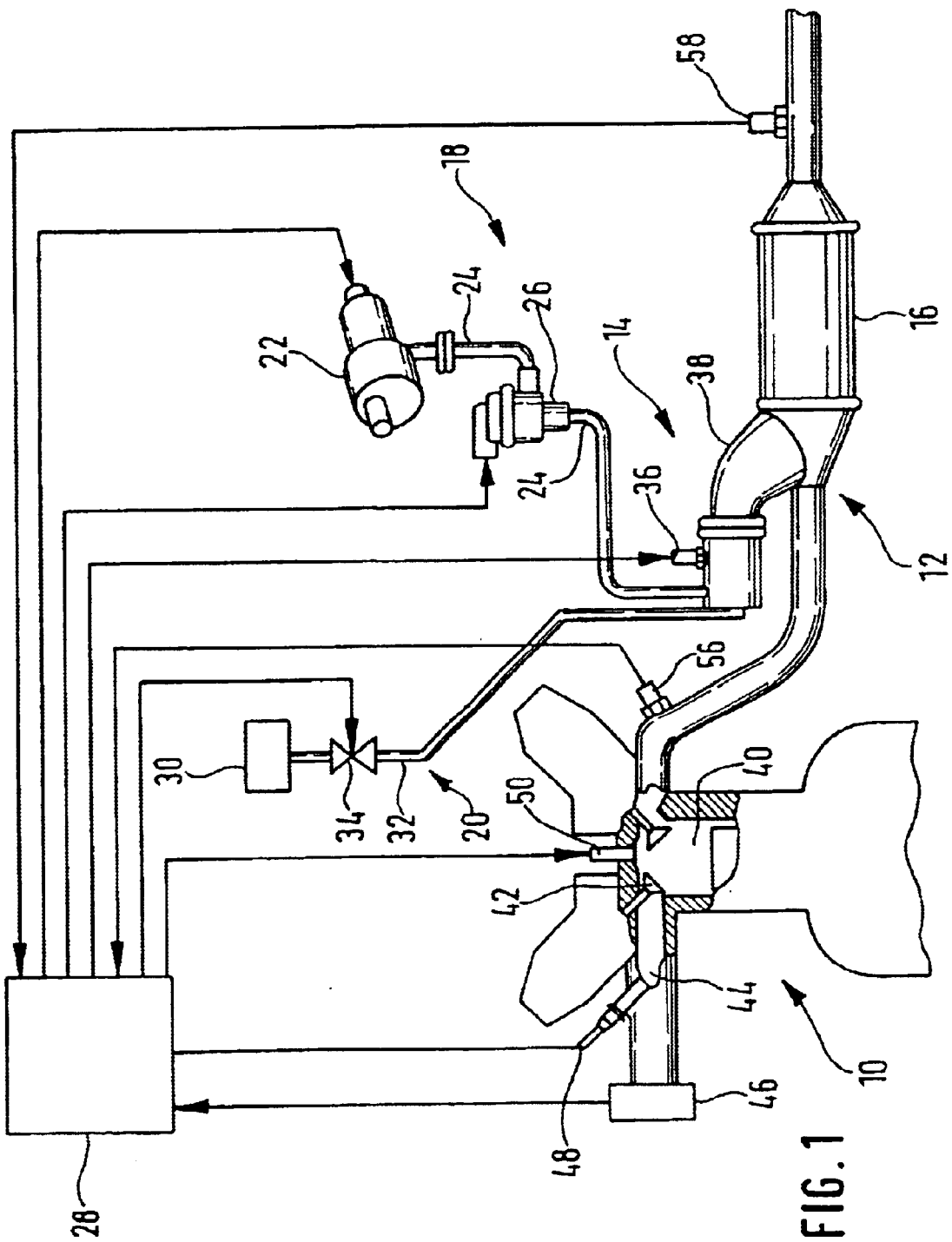
FIG. 1 shows a technical field in which the exemplary embodiment of the present invention shows its effect.

Numeral 10 in FIG. 1 denotes an internal combustion engine having an exhaust-gas system 12 which is provided with a burner 14 upstream from a catalytic converter 16. Via an air path 18, burner 14 may be supplied with air, and fuel may be supplied to burner 14 via a fuel path 20. The air path includes a blower 22, which conveys air to burner 14 via lines 24 and via a valve 26. Both blower 22 as well as valve 26 are controlled by a control device 28. The fuel path may be made up of a fuel reservoir 30, a fuel line 32 and a controllable fuel valve 34. The fuel reservoir is made up, for example, of a tank including a fuel pump which conveys fuel under a specific pressure to the injectors of internal combustion engine 10 and to fuel path 20 of burner 14. A spark plug 36 ignites the fuel-air mixture formed in burner 14 and the resulting flame and/or the resulting heating gas and exhaust gas heat up catalytic converter 16 via a connecting section 38. In the process, the exhaust gas of burner 14 mixes with the exhaust gas of internal combustion engine 10, which result from the combustion of the fuel-air mixture in combustion chambers 40 of internal combustion engine 10. Via an intake valve 42, a combustion chamber 40 is filled with air, or a fuel-air mixture, from an intake manifold 44. In the case shown, an air-flow sensor 46, for example, a hot-film air-mass meter or a manifold-pressure sensor, measures the air quantity flowing into combustion chambers 40. The metering of fuel to the air flowing into combustion chambers 40 is implemented via a fuel injector 48. In the case shown, the mixture formation occurs outside of the combustion chambers in manifold 44. Alternatively, an internal mixture formation may be provided, where fuel injector 48 is positioned so that it meters the fuel directly into combustion chambers 40. The mixture of fuel and air is ignited in combustion chamber 40 by a spark plug 50, is combusted and expelled into exhaust-gas system 12 via a discharge valve 52, when piston 54 is on the upstroke.

The proportion of fuel and air during combustion of the combustion-chamber fill may be determined retroactively by measuring the residual oxygen contents in the exhaust gas of the combusted combustion-chamber fill. This is accomplished by a first lambda sensor 56, which is positioned so that it is exposed to the exhaust gas of combustion chambers 40, but not to the exhaust gas of burner 14.

A second lambda sensor 58 is positioned to detect an average oxygen concentration in the exhaust gas after the mixing of the exhaust gas from combustion chambers 40 of internal combustion engine 10 and burner 14. For this purpose, second lambda sensor 58 may be positioned behind catalytic converter 16, as shown. Alternatively, it may also be located within catalytic converter 16. It is believed that it should be located downstream from the location where the exhaust gases of burner 14 and of internal combustion engine 10 are intermixed.

According to the representation of FIG. 1, control device 28 receives a signal from air-flow sensor 46 indicating the quantity mLM of the air flowing into combustion chambers 40, a signal from first lambda sensor 56 indicating a first oxygen concentration C1, and a signal from second lambda sensor 58 indicating a second oxygen concentration C2. From these signals, and possibly from other signals from additional sensors that are not shown here, control device 28 generates control signals for activating different actuators for the operation of the internal combustion engine and burner 14.

Examples of additional input variables are rotational speed n of the crankshaft of internal combustion engine 10, the temperature of the intake air, the pressure in the intake manifold, the temperature of the cooling water, etc. The actuators which may be required are shown in FIG. 1. These include fuel injector 48, spark plug 50, fuel valve 34, blower 22, valve 26 and spark plug 36. Following a cold start of the internal combustion engine, burner 14 is operated to heat up catalytic converter 16.

Figure 2:
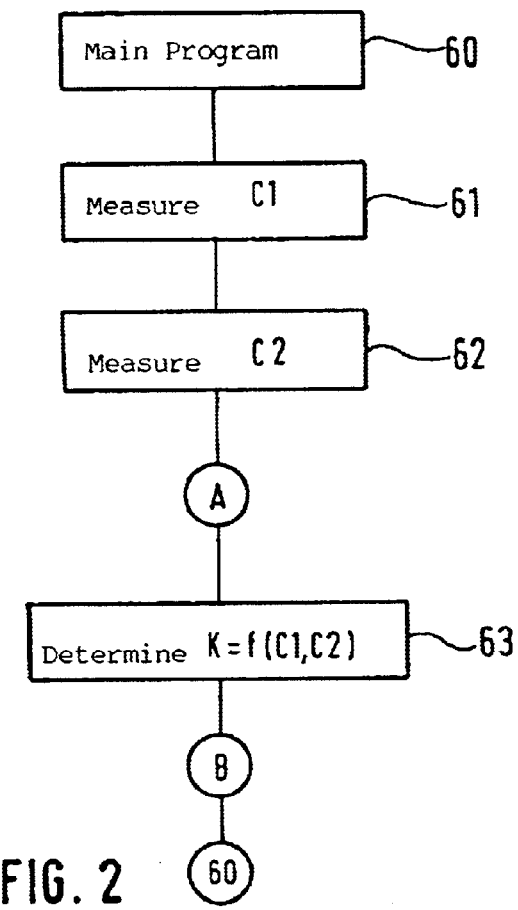
FIGS. 2 through 6 show flow charts as exemplary methods and/or exemplary embodiments according to the present invention.

FIG. 2 shows a flow chart as an exemplary embodiment of the present invention for determining the fuel quantity used to operate burner 14. From a higher-level main program 60, a step 61 is attained in which a first lambda sensor 56 measures oxygen concentration C1 in the exhaust gas of internal combustion engine 10. Subsequently, or in parallel, in step 62, a second lambda sensor 58 measures oxygen concentration C2. Between two marks A and B, fuel quantity K at which burner 14 is operated is determined in step 63.

An element of the exemplary embodiment and/or method according to the present invention provides for determining this fuel quantity K as a function of the measured oxygen concentration C1 and C2. In one case, it may be determined, for instance, whether oxygen concentration C2 is higher or lower than oxygen concentration C1. If oxygen concentration C2 is higher than oxygen concentration C1, burner 14 was operated with a fuel-air mixture that contained less fuel than used in internal combustion engine 10. However, if oxygen concentration C2 is lower than oxygen concentration C1, burner 14 has been operated with a fuel-air mixture that contained more fuel than that in internal combustion engine 10. In this manner, this exemplary embodiment of the present invention may allow a conclusion as to whether the fuel quantity at which burner 14 is operated has an increasing or decreasing effect on the oxygen concentration in the exhaust gas. After running through mark B, a further processing is implemented within the framework of the main program.

Figure 3:
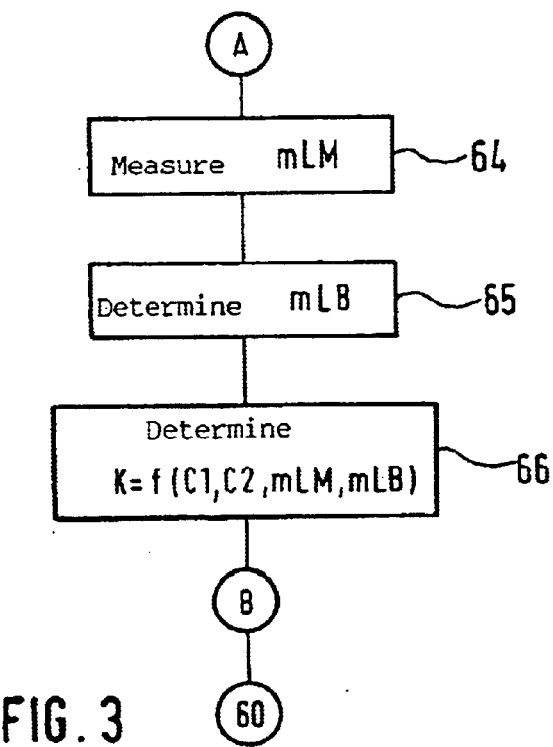

FIG. 3 shows a modification of the program part located between marks A and B of FIG. 2. According to FIG. 3, after running through mark A, air quantity mLM at which internal combustion engine 10 is operated, is determined in step 64. This air quantity may be calculated, for example, from the signal of air-flow sensor 46. Air quantity mLB at which the burner is operated is then determined in step 65. This air quantity either may be measured by an air-flow sensor (not shown here) in air path 18, or it may be determined, for example, according to a predefined relationship from the control signal for blower 22. In step 66, fuel quantity K at which burner 14 is operated is determined as a function of oxygen concentrations C1 and C2 as well as air quantity mLM and mLB. For instance, the following relationship may be used:

$$\lambda B = (mLB * \lambda ges * \lambda M) / [\lambda M * (mLM + mLB) - mLM * \lambda ges]$$

In this context, $\lambda B$ corresponds to the fuel-air ratio at which burner 14 is operated, $\lambda M$ to the fuel-air ratio at which the combustion engine, or internal combustion engine 10, is operated, and $\lambda ges$ to the average lambda value that comes about when internal combustion engine 10 and burner 14 are operated jointly. The value of $\lambda ges$ corresponds to oxygen concentration C2, and value $\lambda M$ corresponds to oxygen concentration C1. Variable $\lambda B$ may be seen as a measure for fuel quantity K to be ascertained. By definition, $\lambda B$ represents the fuel-air ratio at which burner 14 is operated. Expressed as a formula, it corresponds to quotient mLB/mKB*F, F representing a proportionality constant and mKB representing the absolute fuel quantity at which burner 14 is operated. Thus, $\lambda B$ represents a relative fuel quantity, so to speak, at which burner 14 is operated. In this exemplary embodiment as well, a further processing in main program 60 occurs after mark B has been run through.

Figure 4:
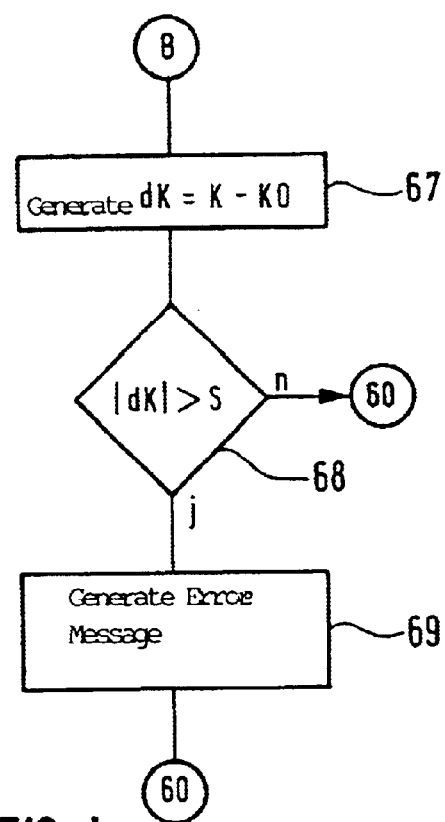

FIG. 4 shows a flow chart for an exemplary method according to the present invention for diagnosing fuel path 20. For that purpose, in a step 67, which is reached after passing through mark B of the preceding exemplary embodiments, a value dK is determined as the difference of the absolute value of K and a predefined comparison value KO. In particular, AB may represent a setpoint value for the fuel quantity at which burner 14 is operated. As already mentioned, both KO as well as variable K may be defined either as relative variable $\lambda B$ or as absolute variable mKB. The instantaneous actual value for K may be determined in the steps coming before mark B, using oxygen concentrations C1 and C2. Given an operative fuel path 20, K will approximately correspond to value KO, and difference DK will be small. If the fuel path is not operative, or given an only partially operative fuel path that provides either too much or too little fuel to burner 14, the difference DK, in contrast, may exceed a threshold value S in step 68. In this case, an error message is generated in step 69. This error message may be stored in a storage module of control device 28 so as to be read out at an appropriate time, for instance, during servicing.

Alternatively, the error message may also be used to signal the error of the fuel path to the operator of the internal combustion engine, for instance, optically by an error light, or acoustically, by an acoustic signal. This exemplary embodiment, thus, may allow a diagnosis of the fuel path in that the fuel quantity determined is compared to a predefined value and that a deviation of the measured fuel quantity from the predefined value that exceeds a threshold value produces an error message, which signals a fault in the fuel supply of the burner.

Figure 5:
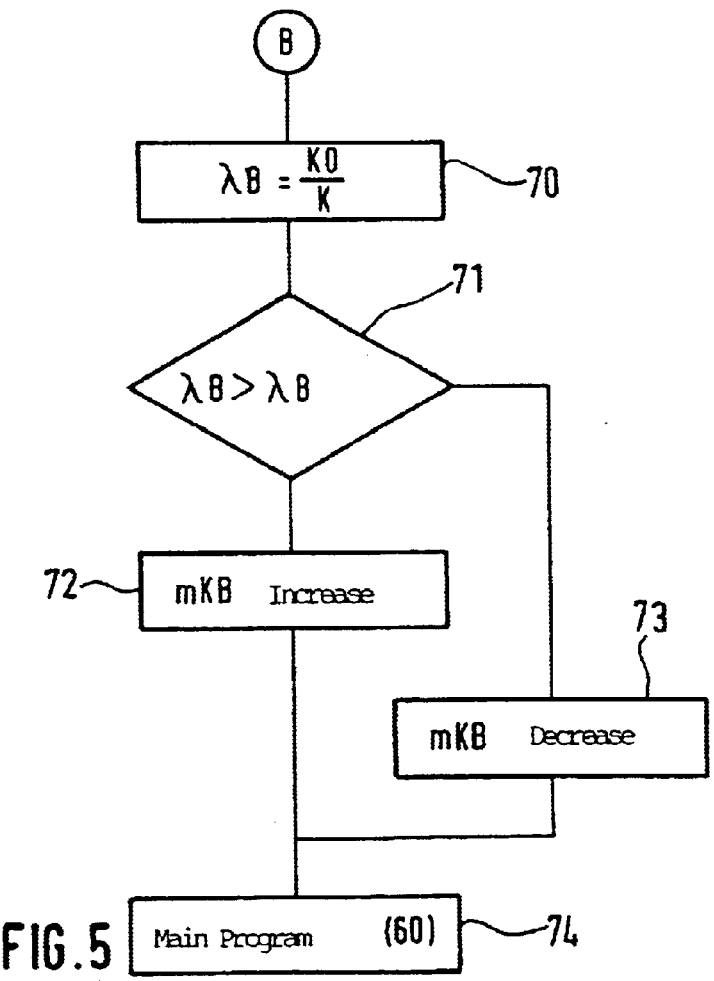

FIG. 5 shows an exemplary embodiment and/or method of the present invention in which fuel quantity K determined according to the present invention is used for a control intervention for correcting the fuel quantity at which burner 14 is operated. In the example shown, it is assumed that relative fuel quantity $\lambda B$ is determined from fuel quantity K (step 70). After running through mark B of the preceding exemplary embodiments, and on the basis of K=$\lambda B$ in step 70, in step 71 the relative fuel quantity $\lambda B$ determined in accordance with the present invention is compared to a setpoint value $\lambda_{setpoint}$. If $\lambda B$ exceeds setpoint value $\lambda B_{setpoint}$, this indicates that fuel quantity mKB at which burner 14 is operated is too low. Correspondingly, in step 72 fuel quantity mKB is increased and a return to the main program implemented (step 60). However, if $\lambda B$ is lower than setpoint value $\lambda B_{setpoint}$, after a negative reply to the query in step 71, fuel quantity mKB is reduced in step 73 and a return to the main program is implemented. In predefined intervals that are determined by time intervals or by angle intervals relative to the rotational movement of the crankshaft of internal combustion engine 10, the main program 60 may be branched off of and into this exemplary embodiment of FIG. 5 to repeat the control intervention. If fuel quantity K is not determined as relative fuel quantity $\lambda B$, as shown here in step 70, but as absolute fuel quantity mKB, the exemplary embodiment of FIG. 5 runs in a manner closely resembling the case shown. It may merely be required to modify comparison query 71 so that the query reads mKB<mKB$_{setpoint}$. Therefore, this exemplary embodiment may represent an exemplary method that is distinguished in that a controlled variable is formed for setting the fuel-air ratio at which the burner is operated, the formation being based at least on the measured first oxygen concentration C1 and the measured second oxygen concentration C2. In this context, the step size used to increase or decrease mKB in steps 72 and 73 may be considered to be the controlled variable.

Figure 6A:
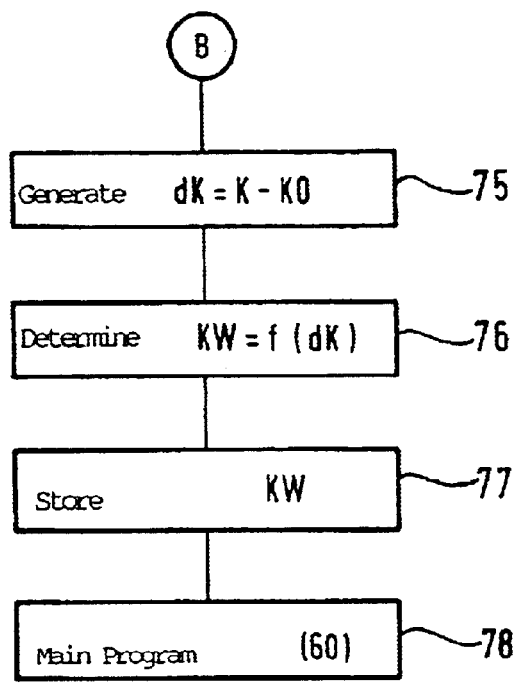
Figure 6B:
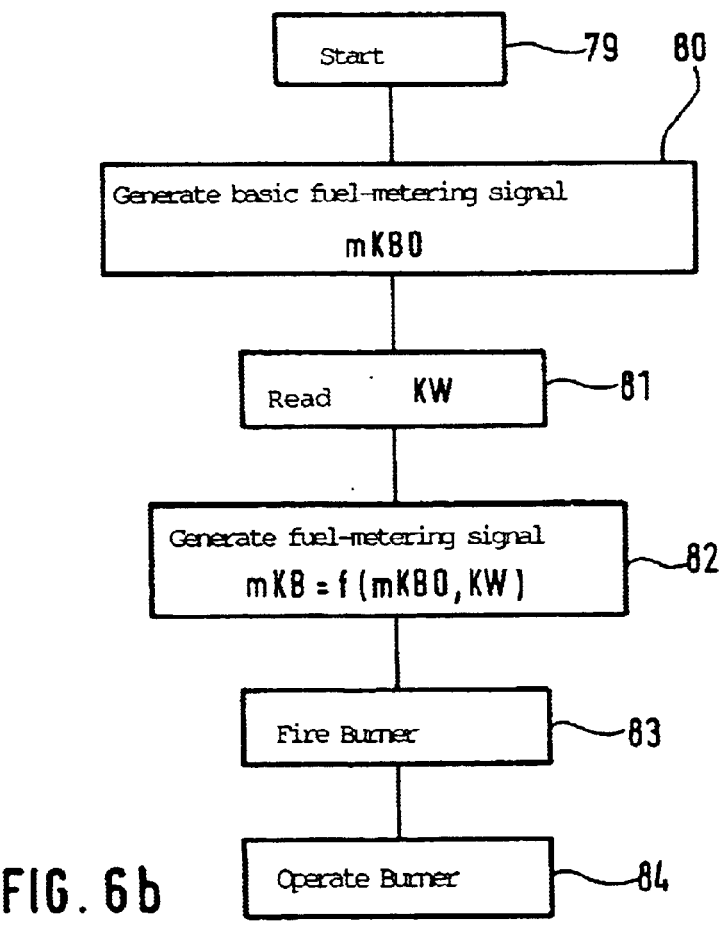

The exemplary embodiments described above assume that the oxygen concentrations C1 and C2 are measured by operative lambda sensors 56 and 58. Immediately following a cold start of internal combustion engine 10, lambda sensors 56 and 58 are not yet operative, however, since they require a certain operating temperature of several 100 degrees Celsius before generating an adequately accurate signal. In this situation, however, the fuel supply to the burner as precisely as possible so as to allow an optimal fuel-air ratio in the burner may be adjusted for a successful firing of the burner. This problem may be solved by the exemplary embodiment of FIG. 6. The exemplary embodiment of FIG. 6 has two parts, 6a and 6b. Part 6a is associated with a first operating phase with operative lambda sensors 56 and 58, and part 6b is associated with a cold start following later with not yet operative lambda sensors 56 and 58.

First, with regard to program part 6a. After running through mark B of the preceding exemplary embodiments, a deviation dK is formed as the difference of K and KO in step 75. This difference is generated analogously to the difference in step 67 of FIG. 4. The result dK, in any event, may indicate the deviation of actual value K of the fuel supply to the burner from a setpoint value KO, so to speak. From this deviation dK, generated in step 75, a correction value KW is determined as a function of deviation dK in step 76. This value is then stored in a memory of control device 28 and processed further with the aid of main program 60. In a subsequent cold start of internal combustion engine 10 in a step 79, a basic fuel-supply metering signal mKBO is generated in a step 80, for instance, as a function of air quantity mLB supplied to burner 14 according to a predefined characteristic curve. A reading out of correction value KW, which had been stored in the preceding or in a preceding operating phase of internal combustion engine 10, follows in step 81. The final fuel-metering signal mKB is subsequently generated as a function of mKBO and correction value KW. For instance, if, in the preceding operating phase it became apparent that the supplied fuel quantity was more likely too low, mKBO is linked to value KW so that the resulting fuel-metering signal mKB is increased with respect to mKBO. Also, KW was determined in the preceding operating phase so that, using KW, the difference dK became as small as possible. Correspondingly, the instantaneous operating phase following the cold start of internal combustion engine 10 may be set an optimal, or at least an advantageous, lambda value (fuel-air ratio) for firing burner 14, using value KW. Burner 14 is fired in step 83.

Following successful firing of burner 14, the burner continues to be operated in step 84 until the catalytic converter has reached its operating temperature. During operation of the burner, a lambda value may be set for the burner that deviates from the optimal ignition lambda value.

The fuel-air ratios for the burner may be regulated, and thereby may be accurately adjusted, with the aid of the exemplary embodiment and/or method of the present invention, without a special sensor being required for the burner.

Moreover, by using the described control intervention a reliable firing of the burner may be improved under all conditions and, in addition, the heating-up phase of the burner may be implemented, in a manner that yields optimal emission values. This may mean, given an optimal heating-up lambda of the combustion engine (of internal combustion engine 10), that the overall lambda in a fired burner may be adjusted so as to be most advantageous for the exhaust gas (such as, for example 1, for a desired pollutant conversion in the catalytic converter), via the fuel-mass stream to the burner, given a burner airflow.

What is claimed is:

1. A method for determining a fuel quantity at which a burner is operated whose exhaust gas mixes with an exhaust gas of an internal combustion engine in an exhaust-gas system in front of a catalytic converter, the method comprising:
   measuring a first oxygen concentration in the exhaust gas of the internal combustion engine spatially before the mixing of the exhaust gas of the burner with the exhaust gas of the internal combustion engine;
   measuring a second oxygen concentration in an intermixed exhaust gas;
   determining the fuel quantity at which the burner is operated by processing the first oxygen concentration and the second oxygen concentration;
   processing an air quantity flowing into the internal combustion engine and an air quantity flowing into the burner when the fuel quantity is determined; and
   determining one of an absolute fuel quantity mKB and a relative fuel quantity based on the following relationship: $\lambda B$ (mLB*$\lambda$ges *$\lambda$M)/[$\lambda$M (mLM+mLB)−mLM*$\lambda$ges].

2. The method of claim 1, further comprising:
   determining an absolute fuel quantity.

3. The method of claim 1, wherein the fuel quantity is determined relative to an air quantity supplied to the burner.

4. A method for determining a fuel quantity at which a burner is operated whose exhaust gas mixes with an exhaust gas of an internal combustion engine in an exhaust-gas system in front of a catalytic converter, the method comprising:
   measuring a first oxygen concentration in the exhaust gas of the internal combustion engine spatially before the mixing of the exhaust gas of the burner with the exhaust gas of the internal combustion engine;
   measuring a second oxygen concentration in an intermixed exhaust gas; and
   determining the fuel quantity at which the burner is operated by processing the first oxygen concentration and the second oxygen concentration;
   comparing a determined fuel quantity to a predefined value; and
   producing an error message if a deviation of the determined fuel quantity from the predefined value exceeds a threshold value, to signal a fault in a fuel supply of the burner.

5. The method of claim 1, further comprising:
   forming a controlled variable for setting a fuel-air ratio, based at least on the measured first oxygen concentration and the measured second oxygen concentration.

6. A method for determining a fuel quantity at which a burner is operated whose exhaust gas mixes with an exhaust gas of an internal combustion engine in an exhaust-gas system in front of a catalytic converter, the method comprising:
   measuring a first oxygen concentration in the exhaust gas of the internal combustion engine spatially before the mixing of the exhaust gas of the burner with the exhaust gas of the internal combustion engine;
   measuring a second oxygen concentration in an intermixed exhaust gas; and
   determining the fuel quantity at which the burner is operated by processing the first oxygen concentration and the second oxygen concentration;

ascertaining one of a relative and an absolute fuel quantity during a first operating phase;

comparing the one of the relative and absolute fuel quantity to a predefined setpoint value;

forming a correction value from a comparison result; and using the correction value at a beginning of a further operating phase to correct the fuel quantity supplied to the burner.

7. The method of claim 6, further comprising:

correcting the fuel quantity supplied to the burner at a beginning of the further operating phase so that a desired fuel-air ratio for a firing of the burner ensues.

8. A control device for determining a fuel quantity at which a burner is operated whose exhaust gas mixes with an exhaust gas of an internal combustion engine in an exhaust-gas system in front of a catalytic converter, the device comprising:

a first arrangement to measure a first oxygen concentration in the exhaust gas of the internal combustion engine spatially before the mixing of the exhaust gas of the burner with the exhaust gas of the internal combustion engine;

a second arrangement to measure a second oxygen concentration in an intermixed exhaust gas;

a third arrangement to determine the fuel quantity at which the burner is operated by processing the first oxygen concentration and the second oxygen concentration;

a processing arrangement to process an air quantity flowing into the internal combustion engine and an air quantity flowing into the burner when the fuel quantity is determined; and a determining arrangement to determine one of an absolute fuel quantity mKB and a relative fuel quantity based on the following relationship: $\lambda B = (mLB*\lambda ges*\lambda M)/[\lambda M (mLM+mLB)-mLM*\lambda ges]$.

9. The control device of claim 8, wherein an absolute fuel quantity is determined.

10. The control device of claim 8, wherein the fuel quantity is determined relative to an air quantity supplied to the burner.

11. The control device of claim 8, wherein a controlled variable for setting a fuel-air ratio, based at least on the measured first oxygen concentration and the measured second oxygen concentration, is formed.

12. A device for determining a fuel quantity at which a burner is operated whose exhaust gas mixes with an exhaust gas of an internal combustion engine in an exhaust-gas system in front of a catalytic converter, the control device comprising:

a measuring arrangement to measure a first oxygen concentration in the exhaust gas of the internal combustion engine spatially before the mixing of the exhaust gas of the burner with the exhaust gas of the internal combustion engine, and to measure a second oxygen concentration in an intermixed exhaust gas; and a processing arrangement to determine the fuel quantity at which the burner is operated by processing the first oxygen concentration and the second oxygen concentration, ascertain one of a relative and an absolute fuel quantity during a first operating phase, compare the one of the relative and absolute fuel quantity to a predefined setpoint value, form a correction value from a comparison result, and use the correction value at a beginning of a further operating phase to correct the fuel quantity supplied to the burner.

13. The device of claim 12, wherein the processing arrangement corrects the fuel quantity supplied to the burner at a beginning of the further operating phase so that a desired fuel-air ratio for a firing of the burner ensues.

14. A device for determining a fuel quantity at which a burner is operated whose exhaust gas mixes with an exhaust gas of an internal combustion engine in an exhaust-gas system in front of a catalytic converter, the device comprising:

a measuring arrangement to measure a first oxygen concentration in the exhaust gas of the internal combustion engine spatially before the mixing of the exhaust gas of the burner with the exhaust gas of the internal combustion engine, and to measure a second oxygen concentration in an intermixed exhaust gas; and a processing arrangement to determine the fuel quantity at which the burner is operated by processing the first oxygen concentration and the second oxygen concentration, to compare a determined fuel quantity to a predefined value, and to produce an error message if a deviation of the determined fuel quantity from the predefined value exceeds a threshold value, to signal a fault in a fuel supply of the burner.

\* \* \* \* \*